(12) United States Patent
Nabuurs

(10) Patent No.: US 6,447,056 B1
(45) Date of Patent: Sep. 10, 2002

(54) VEHICLE HAVING AN OPEN ROOF CONSTRUCTION AND SUCH OPEN ROOF CONSTRUCTION

(75) Inventor: Martinus Wilhelmus Maria Nabuurs, Overloon (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/787,558

(22) PCT Filed: Sep. 27, 1999

(86) PCT No.: PCT/NL99/00599
§ 371 (c)(1),
(2), (4) Date: Mar. 19, 2001

(87) PCT Pub. No.: WO00/18600
PCT Pub. Date: Apr. 6, 2000

(30) Foreign Application Priority Data

Sep. 28, 1998 (NL) ................................................ 1010199

(51) Int. Cl.⁷ ................................................. B60J 7/04

(52) U.S. Cl. ................... 296/214; 296/216.02; 296/221

(58) Field of Search ............................ 296/214, 216.03, 296/220.01, 216.02, 221

(56) References Cited

U.S. PATENT DOCUMENTS 5,029,937 A * 7/1991 Yamamoto ......... 296/220.01 X
5,951,100 A * 9/1999 Ewing et al. ....... 296/216.03 X

FOREIGN PATENT DOCUMENTS

| EP | 0448807 | 1/1991 | |
| FR | 2726512 | 10/1996 | |
| JP | 58004627 | 11/1983 | ................. 296/214 |

* cited by examiner

*Primary Examiner*—Dennis H. Pedder
(74) *Attorney, Agent, or Firm*—Westman, Champlin & Kelly, P.A.; S. Koehler

(57) ABSTRACT

A vehicle having an open roof construction comprising a fixed roof provided with at least two openings which are separated from each other by a central part, and a stationary part fixed to the roof, at least two adjustable closure elements supported by said stationary part, which are each adjustable between a closed position, in which they close the respective roof opening, and an open position, in which they release said opening at least partially. Two movable, substantially rigid screens are mounted under said closure elements, the screens of which are movable between a position in which they are positioned substantially under the respective roof opening and a position in which they release said opening at least partially.

14 Claims, 1 Drawing Sheet

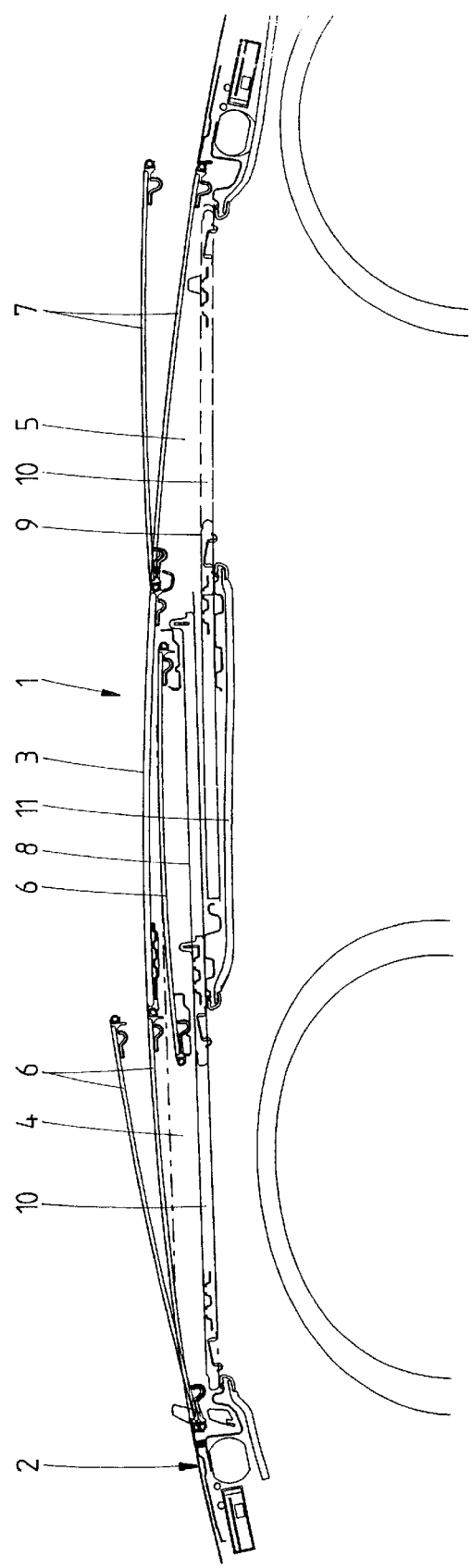

VEHICLE HAVING AN OPEN ROOF CONSTRUCTION AND SUCH OPEN ROOF CONSTRUCTION

CROSS-REFERENCE TO RELATED APPLICATION

This application claims priority of International Application PCT/NL99/00599, filed Sep. 27, 1999, and published in English.

BACKGROUND OF THE INVENTION

The invention relates to a vehicle having an open roof construction. In particular, an open roof construction is provided having a fixed roof with at least two openings, which are separated from each other by a central part, and a stationary part fixed to the roof with at least two adjustable closure elements supported by the stationary part. Each closure element is adjustable between a closed position, in which they close the respective roof opening, and an open position, in which they release said opening at least partially.

Such a vehicle having an open roof construction is known. French patent application No. 2,726,512 for example discloses an open roof construction for a vehicle having two closure elements, which are each adjustable from a closed position to an at least partially opened position. The closure elements may be transparent or non-transparent. In order to protect the occupants against glaring sunlight, rollable sun screens may be provided under the closure elements.

The object of the invention is to further improve the vehicle fitted with the open roof construction of the kind referred to in the introduction described above.

SUMMARY OF THE INVENTION

A roof construction includes movable, substantially rigid screens mounted under the closure elements. The screens are movable between a position substantially under the associated roof opening and a position in which they release said opening at least partially.

This aspect according to the invention provides a robust construction, which makes it possible in a simple manner to open and close a sun screen entirely or partially. Preferably, both sun screens can be moved to a position under the central part, in particular one above another. When the two sun screens are movable in separate guides, the screens can be closed or opened independently of each other. In that case the occupants in front and those in the back of the vehicle can adjust the screens independently of each other as desired.

The invention will be explained in more detail now with reference to the drawing, which schematically shows an embodiment of the invention.

BRIEF DESCRIPTION OF THE DRAWING

The only FIGURE is a longitudinal sectional view of a vehicle roof fitted with an open roof construction comprising two openings separated from each other by a central part.

DETAILED DESCRIPTION OF AN ILLUSTRATIVE EMBODIMENT

The open roof construction 1 is mounted in a fixed roof 2 of a vehicle (not shown). Alternatively, open roof construction 1 forms part of a pre-assembled roof unit forming the fixed roof 2 of the vehicle. The open roof construction includes at least two openings 4, 5, which are separated from each other by a central part 3. Open roof construction 1 has a stationary part, by means of which it is mounted in the fixed roof 2. Furthermore, two adjustable closure elements 6, 7 supported by the stationary part are provided, which in this embodiment consist of substantially transparent panels made of glass or of plastic material. The closure elements 6, 7 are adjustable between a closed position, in which they close the associated roof opening 4, 5, and an open position, in which they release the associated opening 4, 5 at least partially. In order to protect vehicle occupants, for example against glaring sunlight, movable sun screens 8, 9 are mounted under closure elements 6, 7. The sun screens 8, 9 are movable between a position in which they are positioned under the associated roof opening 4, 5 and a position in which they release said opening at least partially.

The FIGURE shows an embodiment wherein both the first sun screen 8 and the rear sun screen 9 can be moved from their position under roof opening 4 and 5, respectively, to a position under central part 3. In order to enable easy movement of the two sun screens 8, 9, the movement takes place rectilinearly in separate guides 10 provided in the stationary part. In the embodiment as shown in the FIGURE, sun screen 8 is stowed above sun screen 9. In order to be able to adjust the degree to which sun screens 8, 9 are opened according to the occupants' needs, the screens 8, 9 can be moved to a position under central part 3.

In the embodiment shown in the FIGURE, the dimensions of openings 4, 5 and those of central part 3 are at least substantially the same. In this embodiment, the screens 8, 9 are preferably movable to a position in which they are disposed one above another under central part 3. In this case, the screens 8, 9 can be stowed away completely between the central part 3 of the fixed roof 2 and an interior liner 11. When the first closure element 6 is a spoiler-type element (rear edge being movable upwardly), it can be moved rearwards so as to release the roof opening 4 entirely or partially. The closure element 6 is thus positioned over central part 3 in said at least partially open position. When the front closure element 6 (with respect to forward motion of the vehicle) is a sliding-tilt roof, the closure element 6 is stowed away under the fixed roof in the at least partially open position, whereby it is movable to a position completely under central part 3. Thereby, according to another embodiment, the two screens 8, 9 and the front closure element 6 can be moved to a position at least partially under central part 3.

When closure elements 6, 7 are moved by means of motors, it may be preferable to have the required current be supplied entirely or partially by a solar cell panel. In this manner, central part 3 may be a solar cell panel, for example in the form of an exchangeable panel. In order to provide an adequate seal and reduce wind noise, the front and the rear closure element 6, 7 can abut directly against central part 3 in the closed position.

In the illustrated embodiment, the front closure element is a sliding-tilt roof, wherein closure element 6 can be moved to a position under central part 3 upon being opened in a rearward direction. On the other hand, rear closure element 7 is a tilt roof or a pop-up roof, where the closure element 7 can be pivoted to a position in which it is tilted upwards at the rear side.

However, the invention is not restricted to the above-described embodiment as shown in the drawing, which can be varied in several ways without departing from the scope of the invention. It is also possible, for example, to move the front opening sun screen to a position under the central part, and to move the rear opening sun screen to a position under the fixed roof rearwards of the rear opening. A construction of this kind is only possible when sufficient space is available under the fixed roof behind the second roof opening. This may for example be the case with a station wagon, or an MPV (multi-purpose vehicle). With vehicles of this kind it would also be possible to construct both the front and the rear closure element as a sliding-tilt roof or spoiler roof.

According to another possibility, the fixed roof of the vehicle has two openings, under which the open roof construction is mounted and wherein the central part forms part of the fixed roof of the vehicle.

What is claimed is:

1. A vehicle having an open roof construction comprising:
   a fixed roof provided with at least two openings which are separated from each other by a central part, and a stationary part fixed to the roof:
   at least two adjustable closure elements, which are each adjustable between a closed position, in which each close one of the roof openings, and an open position, in which each open said roof opening at least partially; and
   screens mounted under said closure elements, each of the screens being movable between a position in which the screen is positioned substantially under the respective roof opening and a position in which the screen opens the roof opening at least partially, wherein the screens are movable, substantially rigid screens which can be moved to an open position in which they are disposed one above another at least partly under said central part.

2. The vehicle fitted with an open roof construction according to claim 1, wherein said screens can both be moved to a position mainly under said central part.

3. The vehicle fitted with an open roof construction according to claim 1, wherein said closure elements include a front closure element, which can be moved to a position at least partially under said central part.

4. The vehicle fitted with an open roof construction according to claim 1, wherein the closure elements directly abut against the central part in the closed position.

5. The vehicle fitted with an open roof construction according to claim 1, wherein the two screens are movable rectilinearly in separate guides.

6. The vehicle fitted with an open roof construction according to claim 1, wherein one of the closure elements is a sliding-tilt roof and the other closure element is a pop-up roof.

7. An open roof construction for a vehicle having a fixed roof provided with two openings which are separated from each other by a central part, comprising:
   a stationary part to be fixed to the roof;
   at least two adjustable closure elements, which are each adjustable between a closed position, in which each is adapted to close one of the roof openings, and an open position, in which each is adapted to open said opening at least partially; and
   screens which are mounted under said closure elements, each of the screens being movable between a position in which each is to be positioned substantially under one of the roof openings and a position in which each is adapted to open the roof opening at least partially, wherein the screens are movable, substantially rigid screens which can be moved to an open position in which they are disposed one above another at least partly under said central part.

8. The open roof construction according to claim 7, wherein said screens can both be moved to a position mainly under said central part.

9. The open roof construction according to claim 7, wherein a front one of said closure elements can be moved to a position at least partially under said central part.

10. The open roof construction according to claim 7, wherein the closure elements are shaped to directly abut against the central part in the closed position.

11. The open roof construction according to claim 7, wherein the two screens are movable rectilinearly in separate guides.

12. The open roof construction according to claim 7, wherein one of the closure elements is a sliding-tilt roof and the other closure element is a pop-up roof.

13. The open roof construction of claim 10 wherein the exchangeable part comprises a solar panel.

14. The vehicle of claim 4 wherein the central part comprises a solar panel.

\* \* \* \* \*